Feb. 2, 1971  W. W. FUNK  3,560,040
GRAPPLE

Filed July 16, 1968  2 Sheets-Sheet 1

INVENTOR
WELKER W. FUNK

BY
William A. Murray
ATTORNEY

Feb. 2, 1971 W. W. FUNK 3,560,040
GRAPPLE
Filed July 16, 1968 2 Sheets-Sheet 2

INVENTOR
WELKER W. FUNK
BY
William A. Murray
ATTORNEY

United States Patent Office 3,560,040
Patented Feb. 2, 1971

3,560,040
GRAPPLE
Welker W. Funk, Moline, Ill., assignor to Deere & Company, Moline, Ill., a corporation of Delaware
Filed July 16, 1968, Ser. No. 745,222
Int. Cl. B66c 1/00
U.S. Cl. 294—97  5 Claims

ABSTRACT OF THE DISCLOSURE

A grapple device that includes a horizontally elongated housing supporting a pair of depending grapple tines and encasing a pair of horizontal cylinders that extend in side-by-side disposition with one of the cylinders operating to move one tine and the other cylinder operating to move the other tine. The housing structure is supported on an end of a boom by a universal joint that has rubber bushings contained therein that frictionally engage cylindrical walls or surfaces of the universal joint so as to dampen and to resist swinging of the grapple structure on the boom.

BACKGROUND OF THE INVENTION

This invention relates to a grapple structure and to the supporting structure that extends between the end of the boom and the swingable grapple tines.

It has heretofore been known to provide a grapple on the end of a boom and to connect the grapple device by a universal joint which permits swinging of the grapple device. It has also heretofore been known to provide a structure which carries the grapples and to provide hydraulic cylinders that extend between the structure and the grapple tines so as to open and close the tines.

Grapple devices are normally mounted on booms that are swung about vertical and horizontal axes. Since the grapple device is on the extreme end of the boom, there is a relatively fast movement of the grapple device in the horizontal direction. Also, the mere traveling over rough ground by the basic support for the boom creates a condition in which violent swinging of the entire grapple device occurs at the universal joint connecting the device to the end of the boom. Often this swinging of the device becomes so severe that portions of the device will actually strike the boom and cause severe damage to the boom and/or the device.

SUMMARY OF THE INVENTION

With the above in mind it is the primary object of the invention to support the grapple structure on the end of the support boom by a universal joint type structure that frictionally and resiliently resists swinging in any direction of the grapple structure. Specifically the joint is composed of upper and lower rigidly joined casings that have internal cylindrical surfaces formed about horizontal axes that are transverse to one another. Carried internally of the casings are rubber bushings that are connected to the boom and support respectively and which have outer surfaces that frictionally and resiliently engage the cylindrical walls of the casings and resist strongly the swiveling of the grapple structure about their respective axes.

DESCRIPTION OF THE PREFERRED EMBODIMENT

Figure 1:
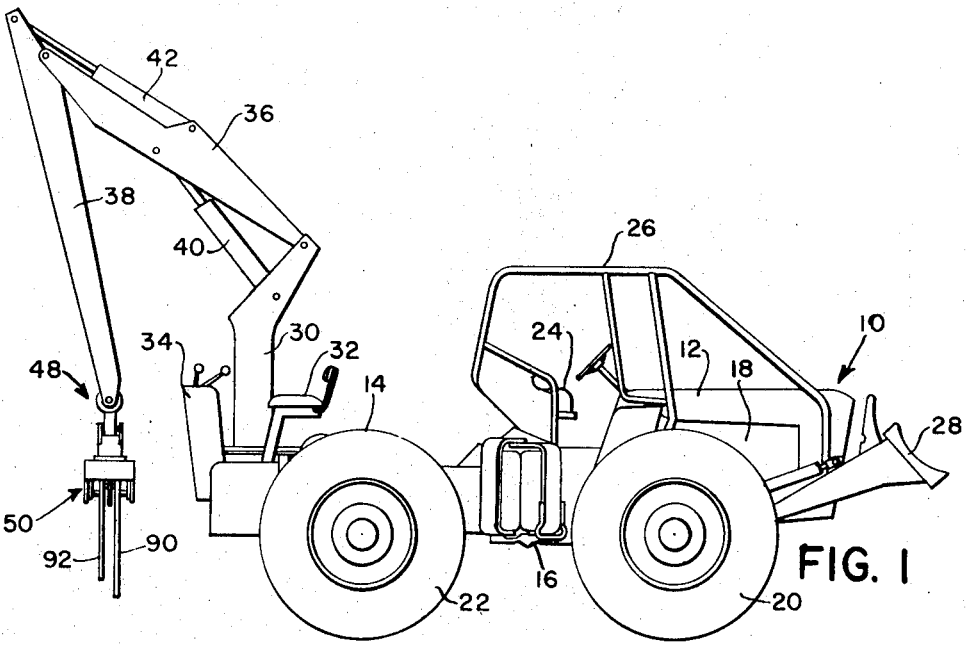
FIG. 1 is a side view of a tractor-mounted grapple utilizing the structure of the present invention.
Figure 3:
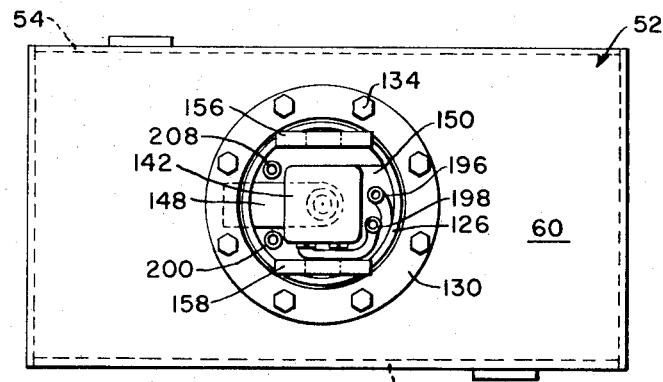
FIG. 3 is a plan view of the grapple device without the universal joint structure attached thereto.

An articulated tractor 10 having a front frame 12 and a rear frame 14 pivotally interconnected about a vertical pivot 16 is supported on front traction wheels 20 and rear traction wheels 22. An operator's station 24 is provided on the front frame 12 and a canopy or guard 26 is provided for safety of an operator in the station. The tractor 10 is provided with a power station or engine 18. The tractor 10 is of the type utilized in the forest and has a forwardly positioned transverse blade 28 that is utilized to move forestry material.

Supported on the rear frame 14 is a vertical stanchion 30 with an operator's station 32 at its base and normally to one side thereof. A control tower 34 is provided rearwardly of the station 32. Extending rearwardly from the upper end of the stanchion 30 is a first boom 36 and at its rearwardmost end is connected a second boom 38. The booms 36, 38 are pivoted about their respective ends by hydraulic cylinders 40, 42. The rear or lower end of the boom 38 is bifurcated at 44, 46 and opens downwardly to receive a universal supporting knuckle 48 that connects the boom to a grapple assembly 50.

The grapple assembly 50 includes a main support housing 52, that is elongated in a horizontal direction, that is composed of outer upright side wall plates 54, 56 and an intermediate or central upright plate 58. The plates 54, 56, 58 are rounded at their opposite ends and their upper edges are rigidly joined together by an overhead plate 60 that extends around the rounded ends of the upright plates. The overhead plate 60 has a central opening 62 and the central plate 58 has an upwardly opening U-shaped opening 64. The central plate 58 divides the entire housing 52 into elongated two equal left- and right-hand compartments 66, 68 that provide vertically extending and horizontally elongated operating zones within the housing. The compartments or zones 66, 68 open downwardly although a pair of bracing plate structures 70, 72 interconnect the lower edge portions of the respective plates 54, 58 and 56, 58. A pivot pin 74 is pivotally carried by a pair of bosses 76, 78 and extends across the left-hand compartment 66. A second pivot pin 80 is carried on a pair of bosses 82, 84 at the other end of the housing 52 and extends across the right-hand compartment 68. Both pins 74, 80 are in the lower portion of the housing support 52.

Figure 4:
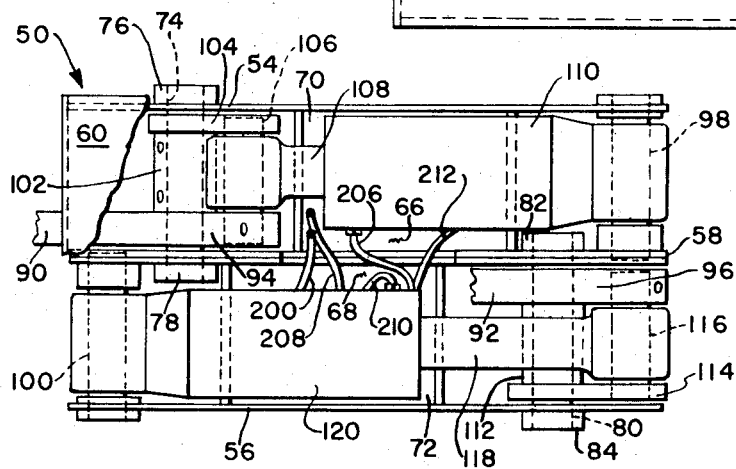
FIG. 4 is a sectional view taken substantially along the line 4—4 of FIG. 2.

Arcuate-shaped grapple tines 90, 92 are carried on the respective pivot pins 74, 80 and depend through the open underside of the housing 52. The tines have lever or extension portions 94, 96 extending upwardly over the respective pins 74, 80 into the upper portions of the operating zones 66, 68. Cylinder-supporting pins 98, 100 are supported by suitable bosses in the respective left- and right-hand compartments 66, 68 above and outwardly of the pins 80, 74 respectively. The tine 90 has a hub portion 102 carried on the pin 74. Integral with the hub portion 102 and in spaced axial relation to the extension 94 is a lever 104. The extension 94 and lever 104 carry a pin 106 on which is mounted the ram end 108. The ram 108 extends into a hydraulic cylinder 110 that is pivotally mounted on the pin 98. The tine 92 has an integral hub portion 112 that is carried on the pin 80 and is keyed thereto. The hub portion 112 has a lever portion 114 that is spaced from the lever extension 96 of the tine 92. Upper ends of the extension 96 and lever 114 have a pivot pin 116 keyed thereto and a ram 118 is carried on the pin. The ram 118 is operated from a hydraulic cylinder 120 that is pivotally carried on the pin 100. Reviewing FIGS. 2 and 4, it becomes apparent that the ram and cylinder 108, 110 and 118 and 120 are in side-by-side relation although extending in different directions from one another. The support housing 52 also includes an upright tubular or cylindrical portion 126 which has its lower edge positioned inwardly of the circular opening 62 in the plate 60. The cylindrical casing 126 is supported on the plate 60 to permit swiveling between the casing 126 and the remainder of the support housing about a vertical upright axis. The joint for providing such action includes an annular ring 128 projecting outwardly from the surface of the casing 126. A spacer ring 130 is positioned outwardly of ring 128 and an upper ring 132 is positioned above the two rings 128, 130 and is bolted to the latter at 134. Reinforcing plate 136 is positioned on the underside of the overhead plate 60 for purposes of reinforcing and stiffening that plate. It clearly becomes apparent from viewing FIG. 2 that there is a joint provided for swiveling between the ring 128, the ring 132 and the upper surface of the overhead panel 60.

Carried internally of the cylindrical casing 126 is a vane type hydraulic motor 140. The motor 140 includes a motor housing 142 and a drive shaft 144. A coupling 146 is keyed to the shaft 144 and has an arm 148 extending longitudinally of the lower housing support and is bifurcated at its end so as to lie on opposite sides of the central wall 58. The housing 142 has a lower plate 150 that extends to the inner wall of the cylindrical casing 126 and is welded as at 152 thereto.

Opposite sides of the cylindrical casing 126 are removed and a pair of upwardly projecting support plates 156, 158 are welded to the casing 126 at the removed portions. The plates 156, 158 are spaced apart to define a bifurcated area in which the lower portion of the support juncture 48 may be received.

Figure 5:
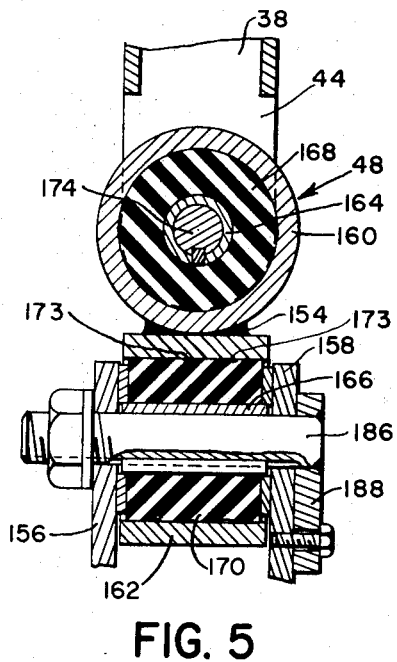
FIG. 5 is a sectional view taken substantially along the line 5—5 of FIG. 2.
Figure 2:
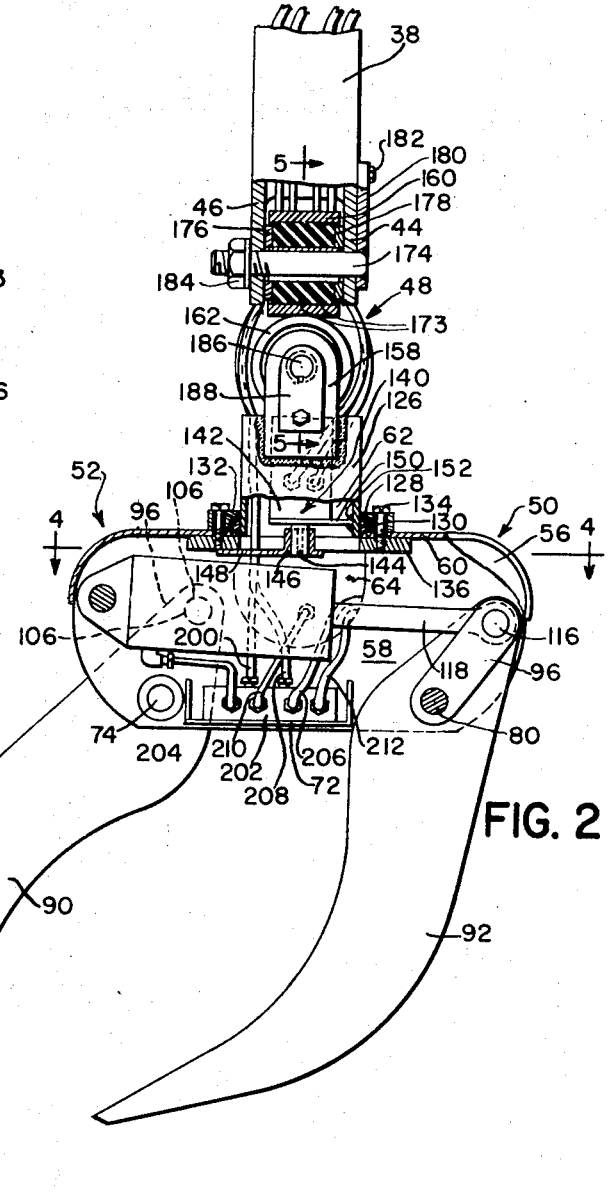
FIG. 2 is an enlarged view of the grapple device with portions broken away to show internal mechanism.
Figure 6:
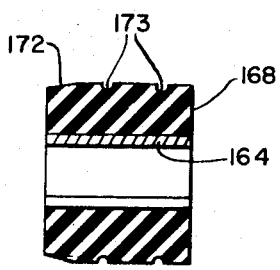
FIG. 6 is a sectional view through the axis of one of the bushings.

Referring now to FIGS. 2, 5 and 6, the universal juncture or connection 48 between the end of the boom 38 and the plates or brackets 156, 158 includes an upper cylinder casing 160 and a lower cylinder casing 162 that are joined at their outer surfaces by suitable welding 154 so that the cylinder casing 160 is transverse to the cylindrical casing 162. Normally both axes are in the horizontal direction although operation of the cylinders 40, 42 or disposition of the grapple device 50 on a load may tend at times to tilt one or both of the axes off of their horizontal Metal bushing supports 164, 166 are carried concentrically within the casings 160, 162 and the supports have bonded to their outer surfaces elastomer bushings 168, 170 that fill the spacing between the respective supports 164, 166 and their cylindrical casings 160, 162. Referring to FIG. 6, it will be noted that in the relaxed condition the bushing 168 has an outer surface that is tapered slightly on one end, as at 172, and has small annular surface grooves 173. The bushings 168, 170 are pressed axially into the respective casings 160, 162 so that their respective outer surfaces frictionally engage the inner cylindrical surfaces of those casings. An evaporative type of lubricant may be provided for inserting the bushing or a more permanent type may be used to increase wear characteristics of the bushing. The grooves 173 retain the lubricant.

Referring now to FIGS. 2 and 5, the support 164 is provided with a suitable keyway in which an internal pin 174 is keyed. A pair of washers 176, 178 are provided on axially opposite ends of the bushing 168. The pin 174 is provided with an integral or welded arm 180 that in turn is bolted at 182 to be locked to the boom 38 to prevent rotational movement. The opposite end of the pin 174 is threaded and receives a nut 184. The nut 184 may be tightened down on the pin 174 which will tend to create minute bending in the bifurcated arms 44, 46 or additional washers 176, 178 may be added. This will cause the washers 176, 178 to apply greater pressure to the bushing 168 which in turn will increase the frictional resistance to movement between the bushing 168 and casing 160. The lower casing 162 is inserted between the brackets 156, 158 and a pin 186, which is keyed to the bushing support 166, has an arm 188 that is bolted to the bracket 158. The bushing may be squeezed axially and resistance against movement between the bushing 170 and casing 162 may be adjusted in a manner described above relative to the upper bushing 168.

Thus, the bushing 168 is fixed against movement in regard to the boom and the bushing 170 is fixed against movement relative to the housing support 52. Movement that is therefore permitted is that which will occur due to overcoming the frictional resistance between the bushings 168, 170 and their respective casings 160, 162, although the washers 176, 178 may act to create some slight friction. The frictional resistance between bushings 168, 170 and casings 158, 160 can be increased or decreased by confining or releasing pressure on the members 168, 170 so as to prevent oscillating freely about the respective axis of the joint 48. The frictional resistance is, therefore, sufficient to prevent the pendulous or swinging type of motion that is normally created whenever the boom structure is moved rapidly. Therefore, the required flexibility at the joint is retained for the proper operation of the grapple, but the joint does not permit the free swinging of the grapple that is present in other grapple devices. The torsional deflection of the bushings 168, 170 will accommodate small movements of the grapple which will occur generally before frictional resistance between the bushings and casing is overcome. In addition there is radial deflection of bushings 168, 170 in the direction of the load which not only cushions the load stresses on all supporting boom parts, but increases the frictional forces and torsional forces as the load increases.

The hoses for operating the various hydraulic devices are contained in the various boom structures 36, 38 and extend from the boom 38 around the knuckle joint 48 and into the casing 126. Motor 140 receives ends of hoses 196, 198. A pressure line 200 extends from the boom 38 around the joint 48, through the casing 126 and into the compartment 68 and is connected to a manifold 202 supported on the brace structure 72 and having pressure outlets connected to hoses 204, 206 that extend to the respective cylinder ends of the cylinders 110, 120. A return line 208 takes a similar path from the boom, around the joint 48, and into the cylindrical casing 126. The hose 208 terminates in the manifold 202. The manifold has connected thereto hoses 210, 212 that extend to the return outlets of the ram ends of the cylinders 110, 120. It should here be noted that the hoses 200–212 are confined within casings so that they will not contact, catch on, or be damaged by tree portions.

It should also be recognized that terminology used in the present specification is for convenience in understanding the invention rather than for purposes of limitation. For example, front and rear directions are obviously used to indicate the fore-and-aft locations of elements rather than to indicate the forward and rearward directions. Also "grapple elements," "grapples," et cetera are intended to include all types of devices that close against one another such as clam shell buckets, tines, clamps or devices suspended on booms or similar equipment where free oscillation is undesirable.

What is claimed is:

1. A supporting structure for supporting a grapple device on a boom, the device having a grapple frame, grapples shiftably mounted thereon, and power means for shifting the grapples, the supporting structure comprising: a rigid structure composed of upper and lower horizontally disposed and rigidly joined casings having internal surfaces round in cross-section formed about horizontal axes offset vertically from and extending transverse to one another; centrally located bushing supports concentric with the respective axes; bushing elements in the spacings between the supports and surfaces fixed to the respective supports and having outer surfaces frictionally engaging the respective internal surfaces of the casings; means for fixedly attaching the bushing support of the upper casing to the boom; and means for fixedly attaching the bushing support of the lower casing to the grapple frame; washers at the end of the rubber bushings; and adjustable means for moving the washers axially in the spacings between the bushing support and the internal surfaces.

2. The structure as set forth in claim 1 in which the bushing elements are of elastomer material and are bonded to the outer surfaces of the bushing supports.

3. The structure as set forth in claim 1 in which a lubricant is provided between the outer surfaces of the bushings and the internal surfaces of the casings to thereby provide uniform frictional resistance to swiveling between the surfaces.

4. A supporting structure for supporting a grapple device on a boom having a bifurcated portion, the device having a grapple frame with an upper bifurcated portion, grapples shiftably mounted thereon, and power means for shifting the grapples, the supporting structure comprising: a rigid structure composed of upper and lower horizontally disposed and rigidly joined casings having internal surfaces round in cross-section formed about horizontal axes offset vertically from and extending transverse to one another, said casing being inserted between the bifurcated portions respectively of said boom and frame; centrally located bushing supports concentric with the respective axes; bushing elements in the spacings between the supports and surfaces fixed to the respective supports and having outer surfaces frictionally engaging the respective internal surfaces of the casings; means for fixedly attaching the bushing support of the upper casing to the boom comprising a pin keyed to the respective bushing support and extending through the bifurcated portion of the boom and fixed against rotation in respect to said portion; and means for fixedly attaching the bushing support of the lower casing to the grapple frame comprising a pin keyed to the respective support and extending through the bifurcated portion of the frame and fixed against rotation in respect to said portion.

5. The structure as set forth in claim 4 in which there are provided washers at the ends of said bushings and said pins have axially adjustable means thereon for adjusting pressure between the washers and the bushings.

References Cited

UNITED STATES PATENTS

| | | | |
|---|---|---|---|
| 3,133,769 | 5/1964 | Drake | 308—238 |
| 3,301,587 | 1/1967 | Heikkinen | 294—67(IA) |
| 3,401,804 | 9/1968 | Link | 212—58 |
| 3,413,029 | 11/1968 | Donovan | 294—88 |

ANDRES H. NIELSEN, Primary Examiner

U.S. Cl. X.R.

294—67, 58